Aug. 5, 1969 F. HUGEL 3,459,390

RELEASABLE ONE-WAY CLUTCH FOR A TAPE REEL

Filed April 17, 1967 3 Sheets-Sheet 1

INVENTOR.
FRED HUGEL
BY
ATTORNEY

Aug. 5, 1969 F. HUGEL 3,459,390

RELEASABLE ONE-WAY CLUTCH FOR A TAPE REEL

Filed April 17, 1967 3 Sheets-Sheet 2

INVENTOR
FRED HUGEL
BY [signature]
ATTORNEY

RELEASABLE ONE-WAY CLUTCH FOR A TAPE REEL

Filed April 17, 1967 3 Sheets-Sheet 3

INVENTOR.
FRED HUGEL
BY
ATTORNEY

United States Patent Office 3,459,390
Patented Aug. 5, 1969

3,459,390
RELEASABLE ONE-WAY CLUTCH FOR A TAPE REEL

Fred Hugel, Boxborough, Mass., assignor to Sanders Associates, Inc., Nashua, N.H., a corporation of Delaware Filed Apr. 17, 1967, Ser. No. 631,200
Int. Cl. G11b *15/43;* F16d *11/12*
U.S. Cl. 242—200 16 Claims

ABSTRACT OF THE DISCLOSURE

A releasable one-way clutch is provided and adapted for use in a magnetic tape cartridge to maintain tension in the portion of the tape disposed between the supply and take-up reels. The clutch includes concentric release and reel hubs with leaf springs attached to the release hub and engaging serrations on the reel hub so that the latter is prevented from rotating except in one direction. The engaging leaf springs are guided through openings in a fixed cam ring between the hubs when the release hub is rotated in one direction until the springs abut the serrations. The springs are withdrawn from the openings when the release hub is rotated in the opposite direction, permitting the reel hub to rotate in either direction. Two such releasable clutches are employed in the tape cartridge, one for each reel so that when the cartridge is not used, the clutches are engaged and the reels can only rotate in such directions as will increase tension in the tape disposed between the two reels. In use, the cartridge is affixed to a tape recorder so that a key on the cartridge engages a keyway on the recorder and the key is turned locking the cartridge and recorder together and releasing the clutches so that the reels can rotate in either direction.

This invention relates to clutch devices and more particularly to a releasable one-way clutch suitable for use to maintain the tape between reels in the unmounted tape cartridge taut and which can be released when the cartridge is mounted to a recorder for use.

Tape tension in a magnetic tape cartridge subject to high shock and vibration loads frequently slackens so much that the tape cannot be positioned properly when the cartridge is secured to a recorder for use. As a result, the cartridge cannot be quickly mounted to the recorder as time is consumed in aligning the tape and/or the tape is improperly aligned and so the recording is poor. A tape cartridge device incorporating features whereby some of these difficulties are overcome is described in copending application of Fred Hugel, Ser. No. 598,675, filed Dec. 2, 1966.

In the copending application, one reel is locked in place and the other is mounted to a one-way clutch. When the cartridge is not in use, the clutch allows the one reel to rotate (due for example, to shock and vibration) in a direction so as to maintain tension in the tape. To initiate use of the cartridge, it is secured to a recorder and the first reel is unlocked, but the other is still restricted to rotation in only one direction by the one-way clutch.

It is one object of the present invention to provide means whereby vibration and shock to the tape cartridge serve to increase tension in the tape disposed between the supply and take-up reels in the cartridge and also avoid the restriction to rotation when in use which occurs when a one-way clutch is employed on one of the reels.

It is another object to provide a tape cartridge which can withstand vibration and shock, can be stored over extended periods and can be quickly secured to a recorder for use without any adjustment or inspection.

It is another object to provide a releasable one-way clutch which permits rotation of a hub in only one direction when engaged and which can be readily disengaged to permit rotation of the hub in two directions.

It is another object to provide such a releasable one-way clutch which can be engaged and disengaged by simple rotary actuation of relatively small amplitude of a part thereof.

It is another object to provide in combination, a tape reel cartridge and recorder which can be quickly engaged and by simple manipulation of a part thereof, the cartridge and recorder can be locked and sealed together and the reels released from the stored condition so as to be rotatable in both directions.

It is another object to provide such a combination employing releasable one-way clutches on each reel so that the tape is held taut dispite vibration and shock and the cartridge and recorder can be quickly engaged and to provide means for simultaneously locking the cartridge and recorder together and releasing the clutches.

Other object and features and advantages of the present invention will become apparent from the following specific description and accompanying drawings in which.

The releasable one-way clutch described herein has unique application, yielding numerous advantages, to the supply and take-up reels of a quick-connect magnetic tape cartridge, because the clutch can be designed to permit one-way reel rotation in either direction and can be disengaged by a simple mechanical actuation of relatively small amplitude and small force. The principal parts of the releasable one-way clutch are illustrated in the sectional views in FIGS. 2, 3 and 4.

Figure 2:
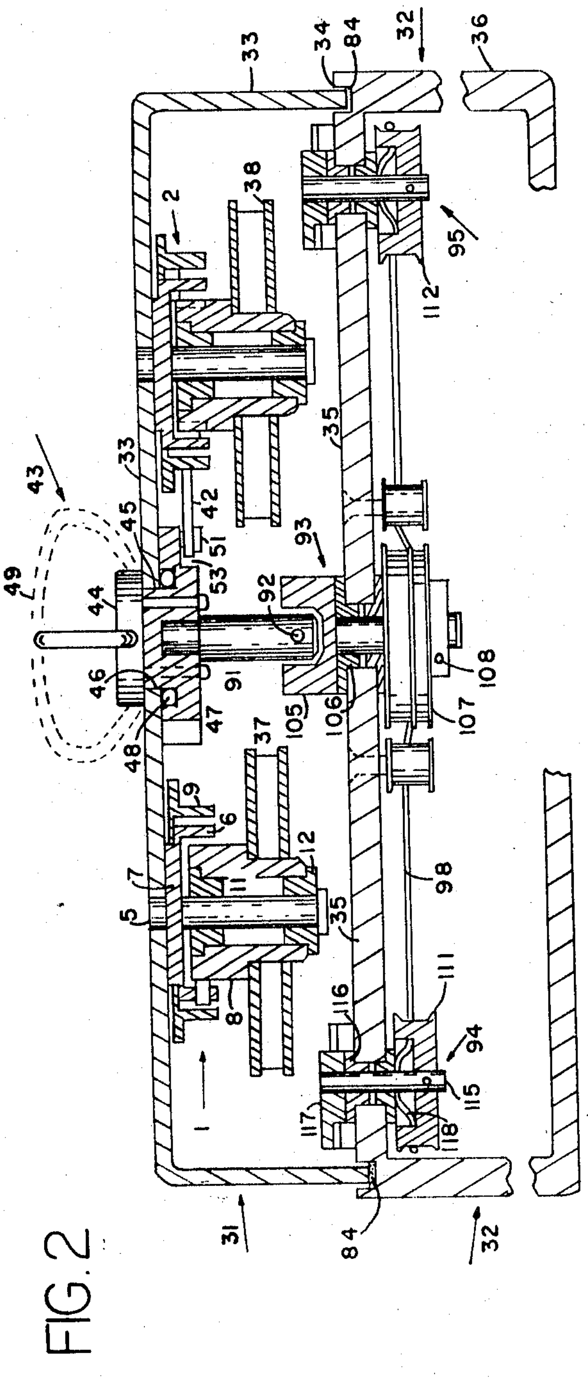
FIGURE 2 is a sectional view taken through the cartridge and recorder to reveal significant parts thereof.
Figure 3:
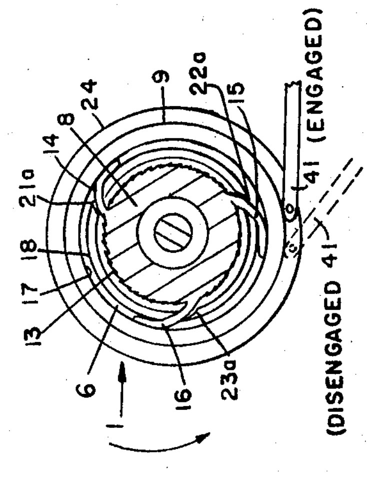
FIGURES 3 and 4 are sectional views of the take-up and supply reel releasable one-way clutches showing the significant parts thereof.

In FIGURE 2 the take-up and supply reel releasable one-way clutch assemblies 1 and 2 are shown in front sectional views taken through the axes of revolution 3 and 4 of the assemblies. The parts shown are all substantial figures of revolution about the axes except as will be apparent from the following description.

The parts in the clutches 1 and 2 are interchangeable, however they are constructed slightly different so that when engaged, the take-up reel 1 can rotate only counterclockwise as viewed from the bottom, whereas the supply reel 2 can rotate only clockwise as viewed from the bottom. This is necessary only because the reels must rotate in opposite directions to make taut the tape therein-between. Obviously, the reels could be mounted so that both rotated in the same direction to make the tape taut; in which case, the clutches could be identical and accomplish the purposes of the invention.

Clutch 1 includes a shaft 5 with the clutch slotted cam ring 6 rigidly attached thereto. The ring extends from the periphery of the disc 7 attached to the shaft 5 and is disposed between the reel hub 8 and the release ring or control hub 9 all of which are figures of revolution concentric with the axis 3.

The reel hub 8 is rotatably mounted to the shaft 5 by bearings 11 and 12 and has longitudinally disposed serrations 13 at the end thereof opposite the slotted cam ring 6. The serrations are engaged by the clutch leaf springs 14 to 16 which are attached at one end to the inside surface 17 of the control hub 9 by, for example, riveting thereto. These springs 14 to 16 in the take-up clutch, are sprung against the outside surface 18 of the cam ring 6 so that when the control hub 9 is rotated counterclockwise relative to the cam ring 6 (as viewed in FIG. 3), the free ends of the springs find their way through skewed slots 21$a$ to 23$a$ in the ring and engage the serrations 13 so as to prevent rotation of the reel hub 8 in the clockwise direction (as viewed in FIG. 3). Thus, the one-way clutch 1 is engaged.

Figure 4:
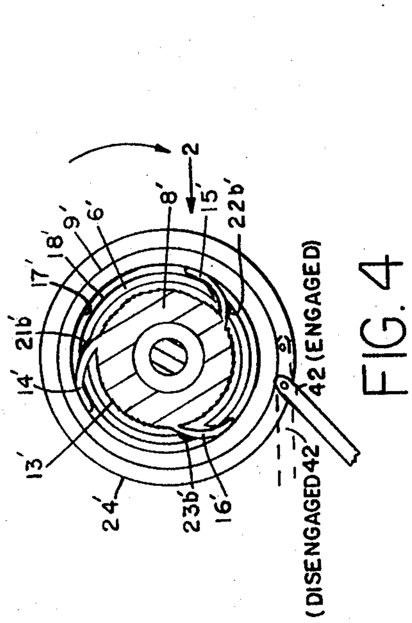

The springs 14′ to 16′ in the supply reel clutch 2 are attached to the inside surface 17′ of hub 9′ so that when the control hub 9′ is rotated clockwise relative to the cam ring 6′ (as viewed in FIG. 4), the free ends of these springs find their way through skewed slots 21$b'$ to 23$b'$ in the ring and engage the serrations 13′ so as to prevent rotation of the reel hub 8′ in the counterclockwise direction (as viewed in FIG. 4). Thus, the one-way clutch 2 is engaged.

The clutch 1 is disengaged by rotating the control hub 9 clockwise relative to the cam ring 6 so that the springs 14 to 16 disengage from the serrations 13 and withdraw at least partially from the slots 21$a$ to 23$a$.

The amplitude of rotation of the control hub 9 relative to the cam ring 6 necessary to engage and disengage the clutch is small and need be only a few degrees of arc in each direction. The torque necessary to rotate the control hub 9 so as to engage and disengage the clutch is also very small. When the clutch is used in a tape cartridge as described herein, the torque necessary to maintain the clutch engaged need only be sufficient to overcome the counter torques produced by vibration, shock and handling. A flange 24 attached to the control hub is provided for attaching control hub rotation mechanisms to the clutch.

The springs 14 to 16 are loaded sufficiently so that when the clutch is engaged, the springs bear upon the serrations with sufficient force to prevent rotation of the reel hub 8 in the clockwise direction in spite of vibration, shock and handling. To assist this purpose, the serrations may define a sawtooth edge as viewed from the end of the reel hub such that the ends of the springs bear against the steep slope of the sawtooth when the clutch is engaged.

Figure 1:
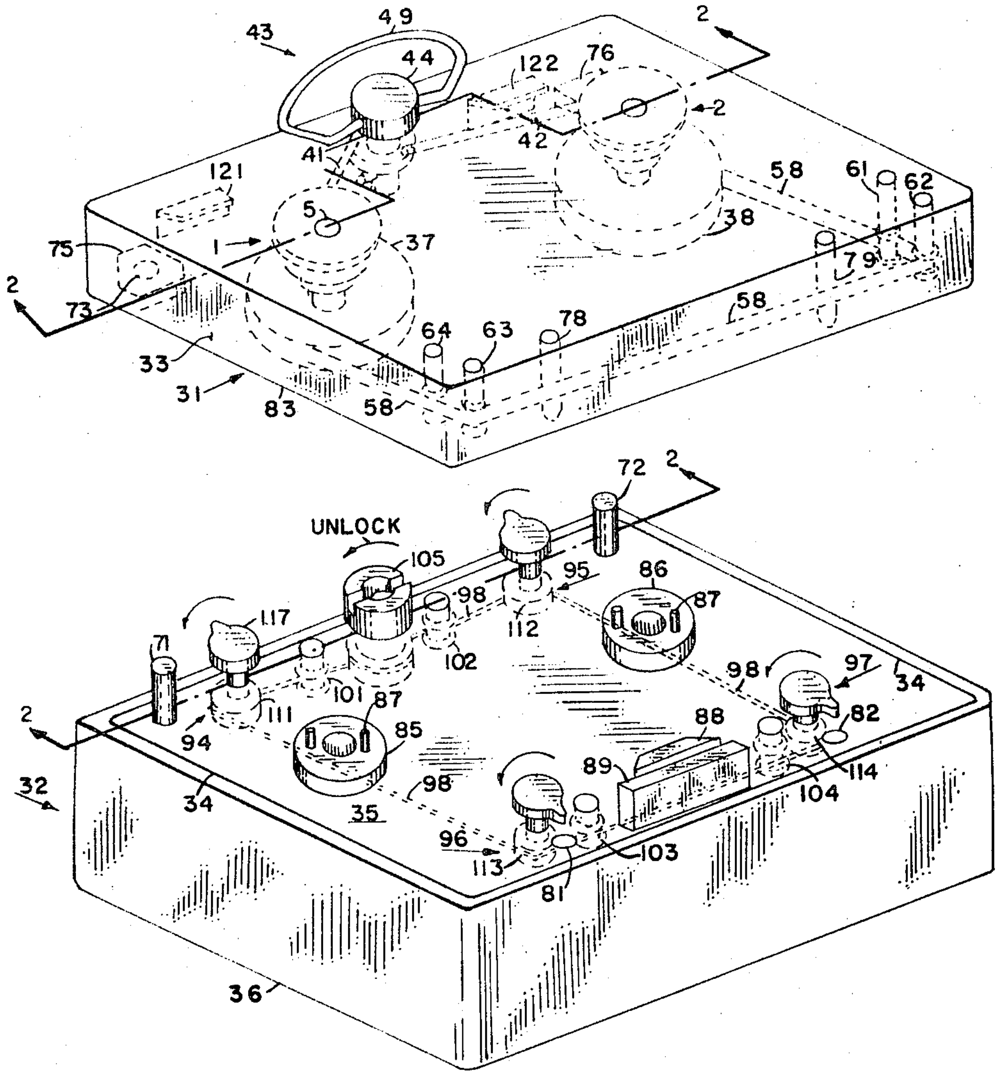
FIGURE 1 is a perspective view of the tape cartridge and tape recorder with which the cartridge is used.

The tape cartridge 31 wherein the releasable one-way clutches are employed and the mating recorder 32 are illustrated in FIGURE 1. The tape cartridge 31 includes a cartridge housing 33 having skirts which fit into a continuous groove 34 along the edge of the recorder deck plate 35. The deck plate 35 is attached to the recorder rousing 36 and has a number of cooperating parts projecting from the top and bottom surfaces thereof. The parts which project from the bottom surface of the plate 35 into the housing are concealed in the view and shown by broken lines. Parts concealed from view within the cartridge housing are also shown by broken lines.

The take-up and supply reels 37 and 38 respectively are mounted on their respective releasable one-way clutches 1 and 2 within the cartridge housing 33. The clutches are secured to the housing by rivets (not shown) through cam ring discs 7 and 7′. Shafts 5 and 5′ are integral with cam ring discs 7 and 7′ and together form the reel shaft assembly. The hubs 9 and 9′ are rotatably held at their flanges 24 and 24′ which fit slideable between the cam discs 7 and 7′ and the housing 33as shown in FIGURE 2.

Control hub links 41 and 42 pivotally attached one end to the flanges 24 and 24′, respectively, and are pivotally attached at their other ends to the quarter turn key assembly 43. The key assembly includes a control knob 44 on the outside of housing 33 which is bolted to a boss 45 extending through an opening 46 and the control disc 47 seals against the inside of the housing 33 by an O-ring 48 compressed slightly between the control disc and the housing. Thus, the control disc 47 can be manually rotated from outside the housing by rotating the handle 49 attached to the knob 44.

Figure 5:
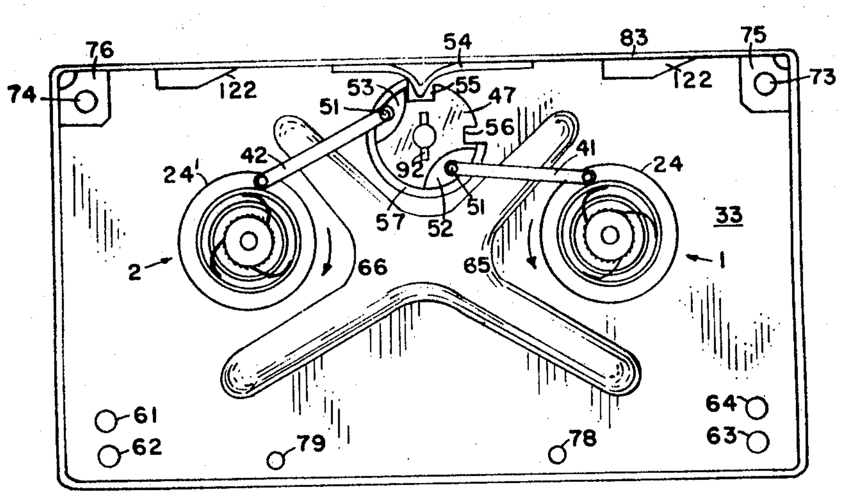
FIGURES 5 and 6 are bottom views of the cartridge illustrating the releasable one-way clutches and actuating mechanisms in the clutch engaged and disengaged positions, respectively.
Figure 6:
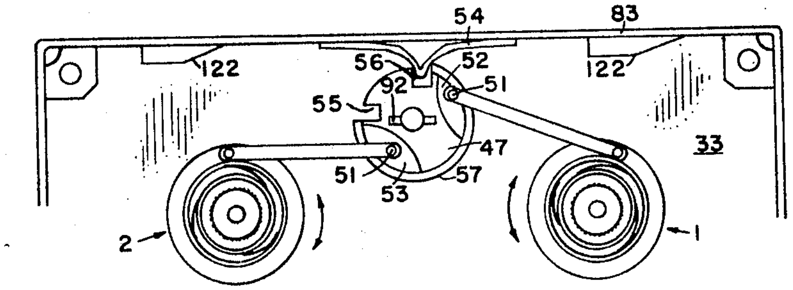

As shown in FIGS. 5 and 6, the links 41 and 42 attach by pins such as 51 to recessed lands 52 and 53, respectively on the bottom of the control disc 47 so that the links are free to swing as necessary to rotate clutch flanges 24 and 24′ when the control disc is turned a quarter turn. This operation of the key assembly 43 is illustrated in FIGS. 5 and 6. FIG. 5 shows the position of the key assembly at which the one-way clutches 1 and 2 engage and FIG. 6 shows the position a quarter turn clockwise (as viewed from the top of the cartridge at which the clutches disengage. A detent spring 54 which is fixed to the housing 33 engages notch 55 in the control disc 47 to hold the "engage position" (shown in FIG. 5) and engages notch 56 in the disc to hold the "disengage position" (shown in FIG. 6). A three quarter flange 57 extending around the disc 47 from notch 55 to notch 56 prevents rotation of the disc except over the quarter turn necessary to engage or disengage the clutches.

In storage, when a supply reel 38 is attched to the hub 8′ of clutch 2 and a take-up reel 37 is attached to hub 8 of clutch 1 and tape 58 is threaded across guide rollers 61 to 64 to take-up reel 37 as shown in FIG. 1, the clutches 1 and 2 are engaged as shown in FIGS. 2 to 5 and the reels 37 and 38 can each rotate in only one direction shown by arrows 65 and 66, respectively. These directions are such that they tend to wind the tape around their respective reels and so the tape does not spill from either reel and any slack tape disposed between the reels is taken up by one or both of the reels when the reels rotate due to, for example, vibration, shock or handling.

When the tape cartridge 31 is used with the recorder 32, it is fitted to the deck plate 35 of the recorder. For this purpose, guide posts 71 and 72 at the rear corners of the recorder deck engage bushings 73 and 74 in corner gussets 75 and 76 attached to the rear inside corners of the cartridge housing 33. The pins 71 and 72 engaging the bushings 73 and 74 locate the cartridge laterally on the recorder deck. The cartridge is located vertically on the deck by gussets which abut the deck at the rear, and by locating posts 78 and 79 at the front of the cartridge housing which engage and abut the edges of the locating holes 81 and 82. The skirt edge 83 of the cartridge housing fits into the groove 34 in the recorder deck plate against gasket material 84 in the groove so that the cartridge is sealed to the recorder.

The take-up reel drive 85 and supply reel drive 86 projects upward from the recorder deck. These drives each carry plungers 87 which are urged upward by springs against the bottom surfaces of their respective reels and engage mating holes in the reels when the drives are later rotated. This structure is described more fully in the above mentioned co-pending patent application. At the same time that the reels contact the drivers, the tape 58 between the reels (which is held taut by the action of the clutches) fits into the slot 88 in the capstan drive and recorder head assembly 89.

Once the cartridge 31 has been fitted to the deck of the recorder 32 as described above, the key assembly 43 is turned a quarter turn to the right (as viewed from above the cartridge) so that the detent spring 54 disengages from notch 55 and engages notch 56 as shown in FIG. 6. This action disengages the clutches 1 and 2 so that the take-up and supply reels can be rotated in either direction by their drives 85 and 86, respectively. Concomitant with this action, the key shaft 91 which is fixedly attached to the control disc 47, also rotates a quarter turn and so cross pin 92 rotates the latch drive drum assembly 93 a quarter turn.

The latching system includes the latch drive drum assembly 93, the four latch cam assemblies 94 to 97, the latch cable 98 and latch cable idler pulleys 101 to 104. The latch drive drum assembly 93 includes above the deck, a keyway shaft 105 which engages the cross pin 92 when the cartridge is fit to the deck. The shaft extends through the deck on bearing 106 to the latch drive drum 107 below the deck which is secured to the shaft by a pin 108.

Below the deck 35, the latch cable 98 is wound around the drum 107 and secured to the drum at one point. The cable is guided around the underside of the deck 35 by idler pulleys 101 to 104 and wraps around and is secured to each of the pulleys 111 to 114 in the latch cam assemblies 94 to 97, respectively. Each latch cam assembly such as 94 includes a shaft 115 on a bearing 116 extending below the deck 35 to the pulley 111 and above the deck to the latch cam 117. The cam 117 is held against the top of bearing 116 by the urging of a spring 118 which separates the pulley 106 from the bottom of the bearing so that when the cam 117 is forced upward, the force is opposed by the spring.

The latch cams of latch assemblies 94 and 95 at the rear of the deck engage latch angles 121 and 122 which are fixed to the cartridge housing 33 on the inside of the rear skirt thereof. The cams of latch assemblies 96 and 97 at the front of the deck engage slots (not shown) in the locating posts 78 and 79, respectiveily. In operation, the latch cams are positioned as shown in FIG. 2 when the cartridge is fit to the deck 35 of the recorder. This is the position which corresponds to the "clutch engage" position shown in FIGS. 3 and 4 and FIG. 5. Upon turning the key assembly 43 a quarter turn clockwise (as viewed from the top of the cartridge) the clutches disengage, as already described, and the drum 107 draws the cable 98 turning each of the cam assemblies 94 to 97 to the positions shown in FIG. 1. In these positions, the rear latch cams engage the latch angles 121 and 122 and the front latch cams engage the slots in the posts 78 and 79 drawing the cartridge housing presses against the gasket 84 in the deck groove 34.

The cable 98 also connects to and positions two tape take-up arms located on the deck 35. These parts are not shown because they are not pertinent to the present invention.

The above description relates to the preferred embodiments of a releasable one-way clutch and to a unique use of the clutch in a magnetic tape cartridge in conjunction with latching mechanisms, whereby the tape is stored in taut condition in the cartridge by the action of the clutches and the cartridge is secured to a mating recorder for use.

I claim:

1. A clutch mechanism comprising,
a housing,
a first hub rotatably mounted with respect to said housing,
a second hub rotatably mounted with respect to said housing and concentric with said first hub,
a ring concentric with said hubs, located between said first and second hubs, and rigidly fastened to said housing,
at least one opening in said ring defining a passage between said hubs and engaging means attached to said second hub which is moved through said passage against said first hub to limit rotational freedom of said first hub when said second hub is rotated in one direction and which moves away from said first hub so as not to limit rotational freedom thereof when said second hub is rotated in a direction opposite said one direction.

2. A clutch mechanism as in claim 1 and in which, said ring is within said second hub, and said first hub is within said ring.

3. A clutch mechanism as in claim 1 and in which,
said ring is relatively stationary,
said second hub is rotatable less than one rotation in either direction, and
said first hub is rotatable continuously in either direction when not limited and is rotatable continuously in only one direction when limited.

4. A clutch mechanism as in claim 3 and in which, said first hub carries a rotatable body, and
said second hub is rotated by a control device such that when the control device is actuated in one direction said body can rotate in either direction and when said control device is actuated in another direction said body can rotate in only one direction.

5. A clutch mechanism as in claim 1 and in which,
said first hub is equipped with serrations, and
said engaging means engages said serrations,
said engagement being such that said first hub is free to rotate in one direction independent of said second hub, but cannot rotate in the opposite direction except with said second hub.

6. A clutch mechanism as in claim 5 and in which,
said engaging means is a leaf spring attached at one end to said second hub and pressing at the other end against said ring, and
said passage directs said other end against said serrations.

7. A clutch mechanism as in claim 6 and further including,
a plurality of said leaf springs spaced on said second hub, and
at least an equal plurality of said passages,
whereby all said springs simultaneously move against or away from said first hub to limit or not limit rotational freedom thereof.

8. A tape recorder cartridge adapted to be secured to a tape recorder, said cartridge comprising,
a cartridge housing,
a pair of tape reels adapted to have tape connected therebetween disposed within said housing,
first and second means each mounted coaxially with respect to one of said reels and rotatable with respect thereto,
means connected to each of said first and second means to permit its associated reel to rotate in only one direction about the axis of the reel,
the permitted rotational directions of said reels being such that the portion of the tape disposed between said reels has tension thereon and rotation of each of said reels on its axis in the permitted direction maintains and creates further tension in that portion of said tape disposed between said reels.

9. A tape recorder cartridge as in claim 8 and in which,
said means connected to said first means permits rotational movement of one of said reels in the clockwise direction while preventing rotational movement of said one reel in the counterclockwise direction, and,
said means connected to said second means permits rotational movement of the other of said reels in the counterclockwise direction while preventing rotational movement of said other reel in the clockwise direction.

10. A tape recorder cartridge as in claim 8 and in which said first and second means and said means connected thereto are a pair of releasable one-way clutches.

11. A tape recorder cartridge as in claim 10 and further comprising,
clutch actuating means mounted for rotation,
a link-member connecting said clutch actuating means to each of said releasable one-way clutches,
whereby rotation of said actuating means in one sense releases said clutches permitting each of said reels to rotate in either direction and rotation of said actuating means in the opposite sense engages said clutches permitting each of said reels to rotate in only one direction.

12. A tape recorder cartridge as in claim 10 and further comprising means connected to said housing and movable relative thereto for simultaneously locking said cartridge to said tape recorder and releasing said releasable one-way clutches.

13. A tape recorder cartridge as in claim 12 in which said means for locking and releasing is operable also simultaneously to unlock said cartridge from said recorder and engage each of said one-way clutches.

14. A tape recorder cartridge as in claim 13 and in which, said means for locking and unlocking said cartridge to said recorder comprises, a key member rotatably mounted to said cartridge housing, a keyway member mounted to said recorder adapted to be engaged by said key member when said cartridge is positioned against said recorder, at least one latch cam mounted to said recorder and moveable by said keyway member, and at least one latch cam catch mounted on said cartridge housing and positioned for engagement by said latch cam.

15. A tape recorder cartridge as in claim 14 and in which, said latch cams are rotated by a common cable connected to each latch cam and to said keyway member, whereby a rotation of said key member in one sense locks said cartridge to said recorder and rotation in the opposite sense unlock said cartridge from said recorder.

16. A tape recorder as in claim 11 and in which each of said releasable one-way clutches comprisse, a first hub to which said reel is mounted, one of said first and second means which comprises a second hub concentric with said first hub, a ring connected to and rotated by said link member, concentric with and disposed between said hubs, at least one opening in said ring defining a passage between said hugs, and in which each of said means attached to said first and second means comprises engaging means attached to said passage against said first hub to limit rotational freedom of said first hub when said second hub is rotated in one direction and which moves away from said first hub so as not to limit rotational freedom thereof when said second hub is rotated in a direction opposite to said one direction.

References Cited

UNITED STATES PATENTS

| | | | |
|---|---|---|---|
| 1,261,356 | 4/1918 | Brown | 242—46.3 |
| 2,732,754 | 1/1956 | Foster et al. | 242—55.13 |
| 3,027,110 | 3/1962 | Andrews | 242—55.13 |
| 3,059,871 | 10/1962 | Loewe | 242—55.13 |
| 3,070,322 | 12/1962 | Razis | 242—55.13 |
| 3,227,387 | 1/1966 | Laa et al. | 242—55.13 |

FOREIGN PATENTS

| | | |
|---|---|---|
| 821,602 | 11/1951 | Germany. |
| 636,046 | 4/1950 | Great Britain. |

GEORGE F. MAUTZ, Primary Examiner

U.S. Cl. X.R.

192—46; 242—204